United States Patent [19]

Maier

[11] Patent Number: 4,768,885

[45] Date of Patent: Sep. 6, 1988

[54] TEMPERATURE MONITORING SYSTEMS

[75] Inventor: Diether C. Maier, Langley, Canada

[73] Assignee: Metal Box Public Limited Company, Reading, England

[21] Appl. No.: 15,879

[22] Filed: Feb. 18, 1987

[30] Foreign Application Priority Data

Feb. 20, 1986 [GB] United Kingdom ............... 8604211

[51] Int. Cl.$^4$ ...................... G01D 18/00; G01J 5/10; G01K 13/00
[52] U.S. Cl. .......................... 374/1; 53/507; 219/121.62; 250/252.1; 374/132; 374/141; 374/164
[58] Field of Search ............... 374/153, 121, 205, 141, 374/127, 129, 132; 219/121 LB, 121 LZ

[56] References Cited

U.S. PATENT DOCUMENTS

| | | | |
|---|---|---|---|
| 2,641,458 | 6/1953 | Gilvarry et al. ............... | 364/566 X |
| 3,626,600 | 12/1971 | Gaither ............................ | 33/568 X |
| 3,914,053 | 10/1975 | Morley et al. .................... | 374/45 X |
| 4,387,301 | 6/1983 | Wirick et al. .................... | 250/252.1 |
| 4,390,258 | 6/1983 | Mizokami ......................... | 250/214 P |
| 4,501,504 | 2/1985 | Urmenyi et al. ................. | 374/153 X |
| 4,522,147 | 6/1985 | Kroll et al. ..................... | 374/121 X |
| 4,566,809 | 1/1986 | Arnaud ............................ | 374/153 X |
| 4,666,297 | 5/1987 | Gonzalez ........................ | 356/43 X |

Primary Examiner—Daniel M. Yasich
Attorney, Agent, or Firm—Christie, Parker & Hale

[57] ABSTRACT

A temperature monitoring system includes a linear array of six pyroelectric sensors mounted in a block. A through hole is provided in the block for each sensor. A bore in the block having an axis which intersects the axis of each through hole accommodates a rotary shaft. The shaft is provided with a diametrically extending bore for each through hole. Thus rotation of the shaft alternately exposes each sensor to the shaft itself and to an object in the line of sight of each sensor as defined by its corresponding throughhole. The output signal from each sensor is differentiated and used to provide a temperature measurement. The output signal is corrected for any drift in the temperature of the shaft or block. This is effected by periodically bringing a heated calibration head operating at a known temperature into the line of sight of each sensor.

4 Claims, 4 Drawing Sheets

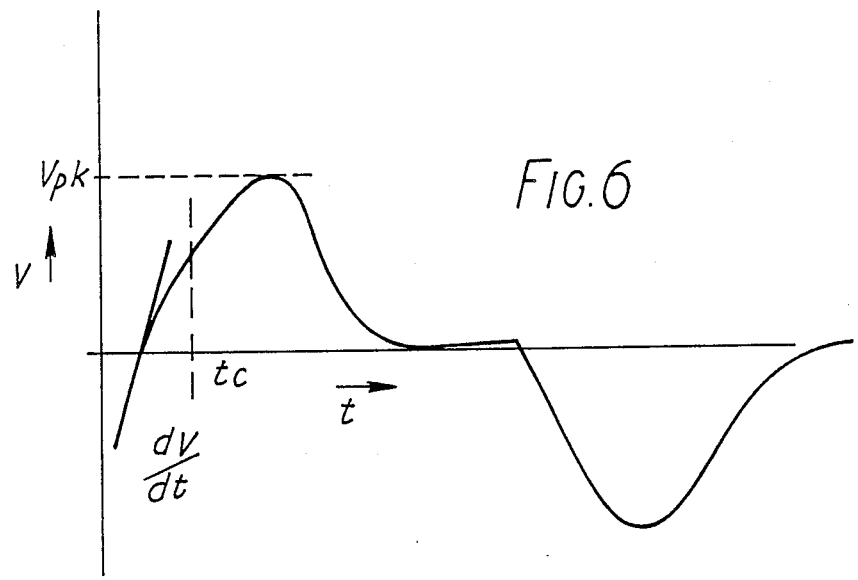
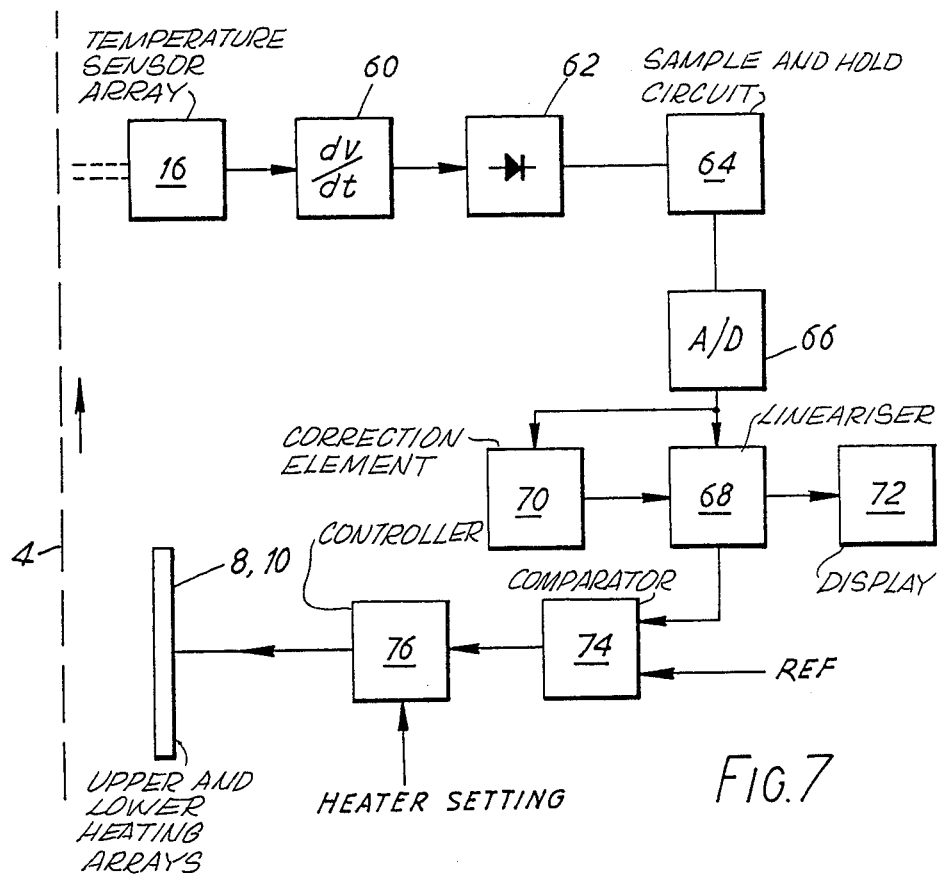

4,768,885

TEMPERATURE MONITORING SYSTEMS

BACKGROUND OF THE INVENTION

1. Field of the Invention

The present invention relates to temperature monitoring systems, for example, for monitoring the temperature of a heated sheet of plastics entering a thermoformer in the manufacture of food packages.

2. Description of the Prior Art

It is known to monitor temperatures using pyroelectric sensors; however, the measurement accuracy and response time of current measurement techniques using such sensors is generally poor, especially for low temperatures and where space is limited.

It is an object of the invention to provide a temperature monitoring system which is adaptable for use in a restricted space and which may have a fast enough response time to enable temperature measurements to be made in quick succession, for example on closely spaced regions of a heated plastics sheet moving at high speed to a thermoformer.

SUMMARY OF THE INVENTION

According to the invention there is provided a temperature monitoring system, comprising a pyroelectric sensor, a shutter movable for exposing the sensor alternately to an object whose temperature is to be measured and to the shutter, and means for differentiating the output of the sensor to provide an output signal representative of the initial rate of change of the output signal and thereby of the temperature of the object.

According to the invention there is further provided a temperature monitoring system, comprising a housing defining a linear array of spaced sight tubes, and an elongate movable member arranged to intersect each sight tube within the housing, the member having a plurality of openings one for each of said sight tubes whereby upon movement of the member in relation to the housing, the member may act as a shutter to open and close each sight tube, each sight tube on one side of the shutter being coupled to a pyroelectric sensor and on the other side of the shutter being arranged for facing an object whose temperature is to be monitored, the system further including means for moving the shutter member to alternately expose each sensor to the shutter itself and to be monitored object, and circuit means for processing the output from each sensor to provide an output signal representative of the temperature of the object being monitored.

BRIEF DESCRIPTION OF THE DRAWINGS

A temperature monitoring system for a line for manufacturing packaging containers from plastics sheet will now be described, by way of example, with reference to the accompanying diagrammatic drawings in which:

FIG. 6 is the output/time characteristic of a pyroelectric sensor of the sensing array;

FIG. 7 is a block diagram of the circuit elements of the monitoring system; and

DESCRIPTION OF THE PREFERRED EMBODIMENT

Figure 1:
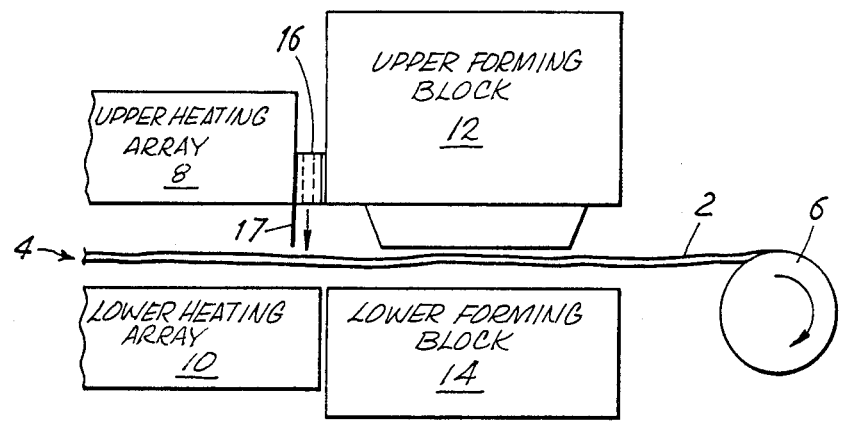
FIG. 1 is a fragmentary side elevation showing part of the line, through which the sheet is indexed by discrete lengths.

The apparatus diagrammatically shown in FIG. 1 is arranged to form shaped food containers by a thermoforming operation on a sheet 2 of plastics material (e.g. polypropylene) which is fed along a sheet feed path 4 from a supply roller (not shown) to take up roller 6. The sheet movement is intermittent, so that the sheet enters the thermoformer as a succession of index lengths between the arrival of which the sheet is stationary.

The sheet 2 in moving along the path passes between upper and lower heating arrays 8 and 10 defining a heating station and then between upper and lower forming blocks 12 and 14 defining a forming station. The heating and forming stations are arranged closely adjacent one another for thermal efficiency and control, but a small (e.g. 10 cm) gap between the upper heating array 8 and the upper forming block 12 provides room for a temperature sensor array 16 which monitors the temperature of the sheet passing below, as is to be described in more detail hereinafter. A shield 17 is located between the upper heating array 8 and the sensor array 16 to shield the sensor array 16 from the heat generated by the heating arrays 8 and 10.

Especially if the containers produced by the thermoformer are destined to be subjected to an elevated temperature such, for example, as thermal sterilisation of their contents after filling, it is important that the heating of the sheet by the heating station should be highly uniform over the plan area of each index length of the sheet. It is also important that the temperature achieved should be within predetermined narrow limits. As will become apparent, the sensor array 16 monitors the temperature of each index length of sheet on a six-by-six matrix, and this enables the heating arrays 8 and 10 to be controlled to achieve the desired uniformity and energy levels for the heating of the sheet. The control may be effected by open loop control by the operator acting on information presented by a visual (or other) display responsive to the output from the array 16, or it may be effected by closed loop control directly in response to the array 16 output.

Figure 2:
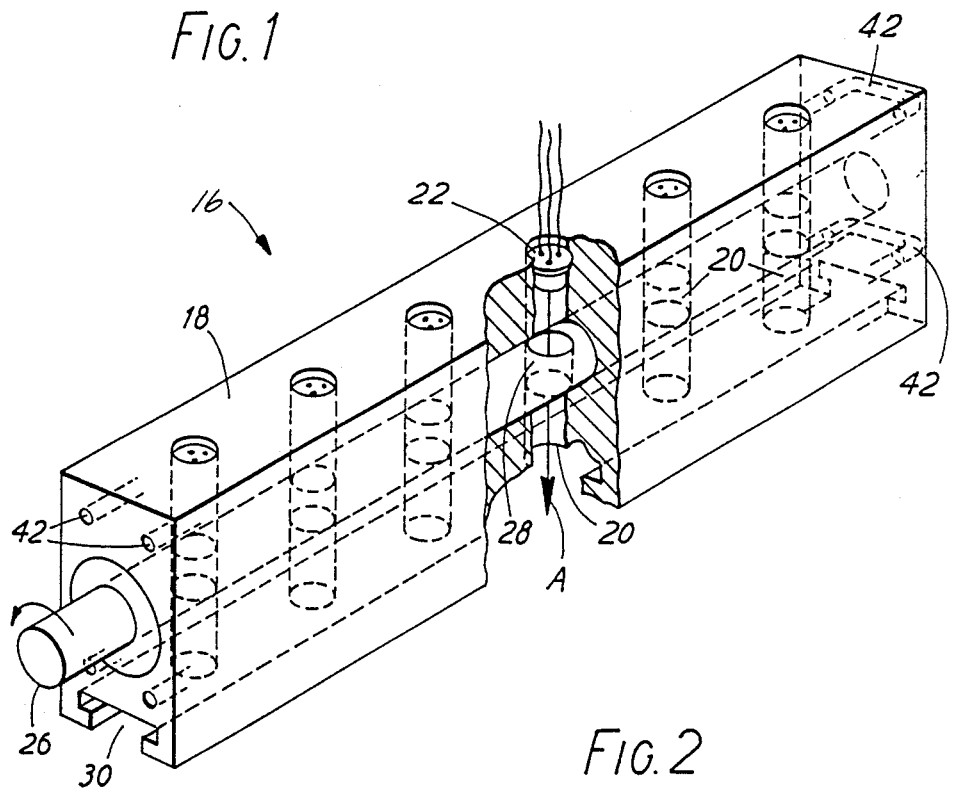
FIG. 2 is a fragmentary perspective view, with part cut-away, of a sensing array of the monitoring system.

The temperature sensor array 16 is shown in more detail in FIG. 2. As shown, support means in the form of an elongate metal block 18 of rectangular cross-section is formed with a row of equally spaced parallel through holes 20. The block 18 extends transversely of the sheet between the upper heating array 8 and the upper forming block 12, the holes 20 being vertical. The upper end of each hole 20 houses a respective pyroelectric sensor 22 while the lower end lies directly above the sheet feed path 4. The holes 20 act as sight tubes for the sensors 22 so that each sensor can view only a descrete area of the sheet as indicated by arrow A.

The block 18 is formed with a horizontal, circular bore 24 of which the axis intersects the axis of each of said holes 20 centrally and at right angles thereto. The diameter of the bore 24 is substantially larger than the diameter of the through holes 20 and accommodates a rotary shaft 26. The shaft 26 is constrained against axial movement but supported for rotation by bearings (not shown). The shaft 26 is provided with a series of through holes 28 having the same diameter as the holes 20. Each through hole 28 is arranged to be aligned with a corresponding through hole 20 when the shaft is in one of two diametrically opposite angular positions. It will thus be seen that as the shaft 26 rotates the through holes 20 will be alternately opened and closed by the shaft 26 twice for each revolution of the shaft; the shaft 26 in effect acts as a shutter.

Figure 3:
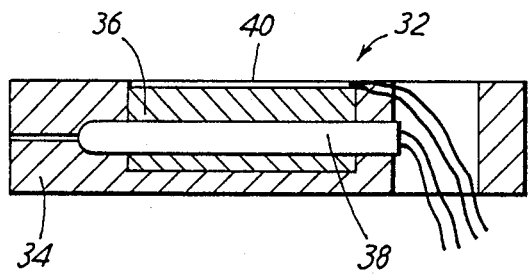
FIG. 3 is a longitudinal section through a calibration head of the monitoring system.
Figure 4:
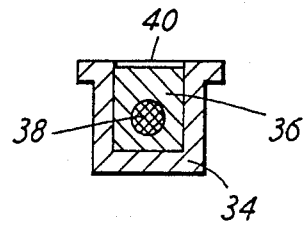
FIG. 4 is a cross-section of the calibration head of FIG. 3.

On the underside of the block 18 is a guide slot 30 which is arranged to be slidably engaged by a calibration or reference temperature head 32 (see FIGS. 3 and 4).

The head 32 is arranged to be located under each through hole 20 in turn so that the pyroelectric sensor 22 in each hole 20 can be periodically calibrated as will be described in more detail hereinafter.

As shown more clearly in FIGS. 3 and 4, the head 32 comprises a U-shaped housing 34 of a thermally insulating material which is slidable within the guide slot 30 and houses a block 36 of thermally conductive material such, for example, as copper. The block 36 has a bore hole which accommodates s tubular heater 38. Bonded to the upper surface of the block 36 is a platinum resistance thermometer 40 which is advantageously painted matt black. A pair of electrical leads are coupled to the resistance thermometer to enable its resistance to be determined. It will be appreciated that by measuring the resistance of the thermometer the temperature of the block 36 can be determined. This thus provides a reference level against which the output of the pyroelectric sensor can be calibrated. A closed loop control device (not shown) may be used to measure the resistance of the thermometer and control the heater 38 in response thereto in a manner to maintain the temperature of the block 36 constant.

The block 18 is provided with a cooling channel 42 (not fully shown) through which a cooling fluid such as water can be circulated to maintain the temperature of the block substantially constant, although some slow drift in temperature will almost inevitably occur.

Figure 5:
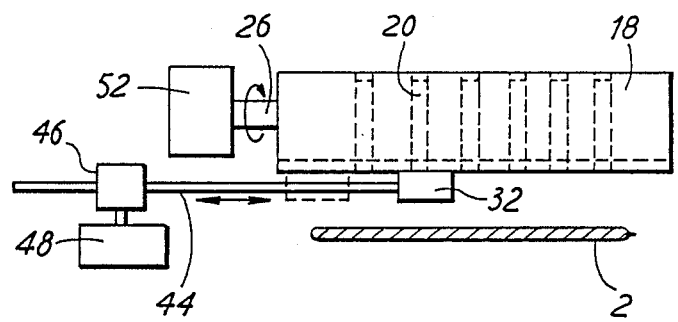
FIG. 5 is a side elevation of the sensing array of FIG. 2.

The head 32 and shaft 26 are coupled to driving mechanisms as shown more clearly in FIG. 5. The head 32 is rigid with a rack 44 drivable by an electric stepper motor 48 via a pinion 46. When required, the motor is energised to cause the rack to index the head 32 in discrete steps to the right (as shown); the head is therefore brought to lie under each sight hole 20 in turn. Thereafter the motor returns the head to the retracted position indicated by the dotted lines in FIG. 5, in which position it is clear of the sight holes. Another electric motor 52 is coupled directly to the shaft 26 so as to rotate the shaft continuously at a constant speed.

In operation the sheet 12 is indexed along the path 4 in regular and equal steps. During the dwell period between successive steps, the index length of sheet lying between the upper and lower heaters 8 and 10 is heated, and the index length of sheet lying between the upper and lower forming blocks 12 and 14 (and which will have been heated during the preceding dwell period) will be shaped to form tray-like packaging containers and severed around the containers by a conventional thermoforming operation in which the upper and lower blocks are brought into engagement with one another and then separated. The containers so formed will be ejected and conveyed to a packing station by means not shown.

During the next step forward the index length sheet which has just been heated by the arrays 8 and 10 will fly under the temperature sensor array 16. At the same time the remnants of the index length from which the containers have been punched will be taken up by the take up reel 6.

As the sheet 2 passes under the temperature sensor array 16, rotation of the shaft 26 will alternately open and close the through holes 20 in synchronism. The speed of rotation of the shaft is such that each pyroelectric sensor 22 will view a plurality of areas of each index length of the sheet as it passes. From the readings obtained a temperature pattern of the index length can be mapped out in matrix form, and the heating arrays can be controlled by open or closed loop control to render the heating pattern substantially uniform for subsequent portions to be heated.

During the dwell period between successive indexing movements of the sheet 2, the motor 48 is energised to drive the head 32 along under the through holes 20 as previously mentioned. During this time each pyroelectric sensor 22 will therefore measure the temperature of the block 36 rather than the temperature of the sheet 2. By this means the output of the pyroelectric sensor can be periodically calibrated (as will be described herinafter). It will be appreciated that the calibration need not be performed during each dwell period but can be performed once every ten or more dwell periods. The object of the calibration step is to correct any gradual drift in error to which the temperature sensor array may be subject, for example, resulting from a drift in ambient temperature of the rod 26.

Considering the sensor array 16 in more detail, it is to be appreciated that in operation, each pyroelectric sensor 22 produces an output in response to temperature changes to which it is presented. Thus if the sensor first views the sheet 2 and then, as the rod 26 rotates, the rod 26, the sensor will produce an output signal which will be representative of the temperature difference between the two objects. The temperature of the rod 26 will be approximately the same as that of the block 18.

FIG. 6 shows the voltage versus time characteristic of a pyroelectric sensor. As can be seen, once the sensor 22 experiences a positive or negative temperature change its output voltage will rise over a period of time in an appropriate sense to a peak (Vpk), and then drop again to zero. The rise time of the output signal to Vpk is substantial, and reliance on repeated measurements of Vpk would severely limit the number of temperature measurements which could be obtained per sensor 22 along each index length of the sheet. Applicants have found, however, that rather than measuring Vpk itself, a sufficiently accurate prediction of the prospective value of Vpk can be obtained from the initial rate of rise $dv/dt$ (FIG. 6) of the sensor output signal. Thus be differentiating the sensor output signal at the beginning of its rise towards Vpk, a signal representative of temperature can be obtained. The speed of rotation of the shaft 26 is sufficiently slow to allow the determination of $dv/dt$ for each sensor, but fast enough to close each sensor from the sheet 2 long before its output signal has risen to its peak Vpk; the instant of obturation is shown at time tc in FIG. 6. By repeatedly differentiating the output signal from the sensors 22 during the passage of an index length of the sheet 2 past the sensor array 16, six different averaged measurements of the sheet temperature are obtained from each of the six sensors, thereby creating a six-by-six temperature matrix for each index length.

Figures 8A, 8B:
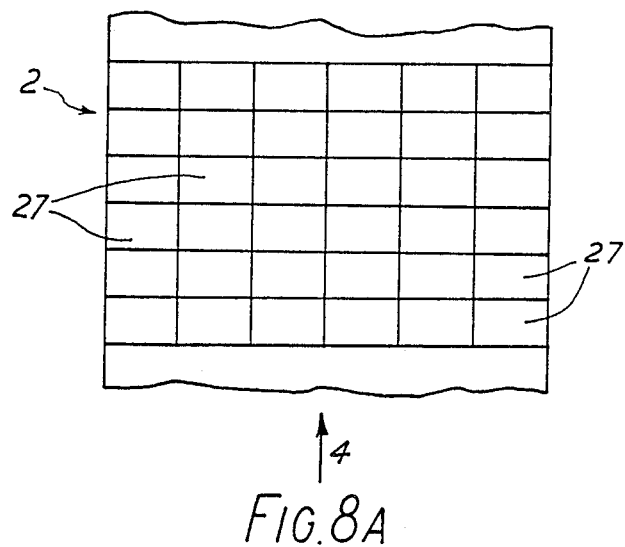
FIGS. 8A and 8B are respective plan views of an index length of the plastics sheet, and a T.V. monitor forming a display unit for the monitoring system, as it might appear in relation to the index length.

FIG. 8A shows an index length of the sheet when marked with the thirty-six rectangular areas or regions 27 of which the temperature measurements are made; FIG. 8B correspondingly shows the corresponding matrix of temperature measurements which might typically be developed from the output signals of the sensors 22, as displayed on a T.V. monitor forming a visual display unit 72.

The circuit provided for determining the temperature of sheet 2 and controlling the heating arrays 8 and 10 in response thereto will now be described in more detail with reference to FIG. 7. For the sake of simplicity, only the circuit associated with one sensor 22 is shown in FIG. 7; however, it is to be understood that the circuit is replicated for the other five sensors. Alternatively, only a single circuit may be used, the six output signals from the sensors being time division multiplexed so as to be processed by the circuit in succession.

Referring now to FIG. 7, the output signal from the sensor 22 is fed through differentiating means in the form of a differentiating circuit 60, and via a filter and rectifying circuit 62 to a sample and hold circuit 64. The output of the sample and hold circuit 64, representative of the differential dv/dt at the beginning of the sensor output signal, is fed to an Analogue to Digital convertor 66 and passed to a lineariser 68 which compensates for the non-linear response of the sensor. The lineariser also takes account of a correction factor represented as a correction signal held and supplied by a correction element 70. This signal, which corrects for any drifts in ambient temperature of the shaft 26 or the block 18, is periodically updated from the output of the Analogue to Digital convertor 66 during the periods when the sheet 2 is stationary and the sensor is monitoring the temperature of the calibration head 32.

The output signal from the lineariser 68, representing the temperature of the sheet 2, is fed to a display 72 where the temperature profile of the sheet is displayed graphically and/or numerically, and/or it is fed to a comparator 74 where it is compared with a reference level fed manually or automatically on a line 73. The display unit 72 may be (or include) a T.V. monitor, the display on the monitor being preferably of the form shown in FIG. 8B. The output of the comparator 74 may be used to control the heater arrays 8 and 10 by means of a controller 76 having a feedback signal from the heater arrays fed on a line 77.

Each heater array 8, 10 is formed of one hundred and twenty-eight infra-red heating elements arranged in an eight (lateral) by sixteen (longitudinal) array. The heaters are individually controllable by closed loop control in response to reference signals set by the operator. Alternatively however, the heaters may be controlled automatically in response to the outputs from the sensors 22 for example, by means of a controller 76 having a feedback signal from the heater arrays fed on a line 77 and operating in response to the output from the comparator 74.

The T.V. monitor (where provided) may thus provide a map showing the temperatures imposed on each passing index length of the sheet 2 by the two heating arrays 8 and 10. By looking at the map (or other visual display) an operator can understand what adjustment of the energisation of the heating elements is needed; he can then vary the reference signals on the six lines 73 to effect the adjustment. In the described alternative wherein the heater energisation is adjusted automatically in response to the temperature measurements made, the T.V. monitor may be provided for supervision purposes.

Each part of the T.V. monitor display may be provided with a background which can change in colour. This facility is particularly useful to alert an operator to a particular condition. Thus, for example, an area of the display representing an optimum sheet temperature band may have a green background, areas representing bands of acceptable temperature lying respectively above and below the optimum temperature band may be red and blue, and areas representing unacceptable temperature bands lying respectively above and below the red and blue bands may be white and purple.

In a modification of the arrangement shown, the holes 28 in the shaft 26 are angularly displaced relative to one another to provide time shifted output signals from the sensors 22; a single circuit lacking any multiplexing provision can then be used for processing all six output signals.

Since the output of the Analogue to Digital convertor 66 is in digital form, the lineariser 68, the correction element 70, the comparator 74 and controller 76 can each be in microprocessor form, and they can be integrally combined in a microcomputer as desired.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. A temperature monitoring system, comprising:
   a housing defining a linear array of spaced sight tubes, and a passage intersecting each sight tube;
   an elongated member movably mounted in the passage in the housing to intersect each sight tube within the housing, the member defining a plurality of openings one for each of said sight tubes whereby upon movement of the member in relation to the housing, the member may act as a shutter to open and close each sight tube;
   a pyroelectric sensor coupled to each sight tube on one side of the shutter;
   a support means for supporting an object whose temperature is to be monitored, located on the other side of the shutter;
   drive means coupled to the shutter member for moving the shutter member to alternately expose each sensor to the shutter itself and to the monitored object;
   circuit means coupled to each sensor for processing the output from each sensor to provide an output signal representative of the temperature of the object being monitored;
   a calibration head;
   means for heating the calibration head to a predetermined temperature; and
   means coupled to the calibration head for displacing the calibration head periodically into the line of sight of each sight tube so that the corresponding sensor is alternately exposed to the shutter member and the calibration head and is responsive to produce a signal representative of the difference between the shutter temperature and the said predetermined temperature, the circuit means including correction means for responding to the said difference-dependant signal so as subsequently to correct the output signal in accordance with any departure of the said difference from a predetermined value.

2. A temperature monitoring system, comprising:

a housing defining a linear array of spaced sight tubes, and a passage intersecting each sight tube;

an elongated member movably mounted in the passage in the housing to intersect each sight tube within the housing, the member defining a plurality of openings one for each of said sight tubes whereby upon movement of the member in relation to the housing, the member may act as a shutter to open and close each sight tube;

a pyroelectric sensor coupled to each sight tube on one side of the shutter;

a support means for supporting an object whose temperature is to be monitored, located on the other side of the shutter;

drive means coupled to the shutter member for moving the shutter member to alternately expose each sensor to the shutter itself and to the monitored object; and circuit means coupled to each sensor for processing the output from each sensor to provide an output signal representative of the temperature of the object being monitored, the circuit means comprising:

a differentiating of each sensor, and sampling means coupled to the output of the differentiating circuit for sampling the initial level of the differentiated output and responsive thereto to produce said output signal.

3. A system according to claim 2, including an Analogue to Digital convertor coupled to the output of the sampling means for converting said output signal into digital form, and a display unit for displaying the temperature which the digital signal represents.

4. Heating apparatus for heating a sheet plastics member which is displaced along a path through the plant in discrete steps, said apparatus comprising:

a heating array which has a plurality of individually controllable heating elements and is arranged for heating successive lengths of the sheet member, a temperature monitoring system located immediately downstream of the heating array, and control means responsive to the output signal produced by the monitoring system during each displacement of the sheet plastics pattern on the subsequent length of the sheet plastics member, the temperature monitoring system comprising:

a housing defining a linear array of spaced sight tubes, and a passage intersecting each sight tube;

an elongated member movably mounted in the passage in the housing to intersect each sight tube within the housing, the member defining a plurality of openings one for each of said sight tubes whereby upon movement of the member in relation to the housing, the member may act as a shutter to open and close each sight tube;

a pyroelectric sensor coupled to each sight tube on one side of the shutter;

a support means for supporting an object whose temperature is to be monitored, located on the other side of the shutter;

drive means coupled to the shutter member for moving the shutter member to alternately expose each sensor to the shutter itself and to the monitored object; and circuit means coupled to each sensor for processing the output from each sensor to provide an output signal representative of the temperature of the object being monitored.

* * * * *